3,043,540
AIRPLANE INSTRUMENTS
Leonard M. Greene, Chappaqua, N.Y., assignor to Safe Flight Instrument Corporation, White Plains, N.Y., a corporation of New York
Filed Nov. 17, 1959, Ser. No. 853,516
29 Claims. (Cl. 244—77)

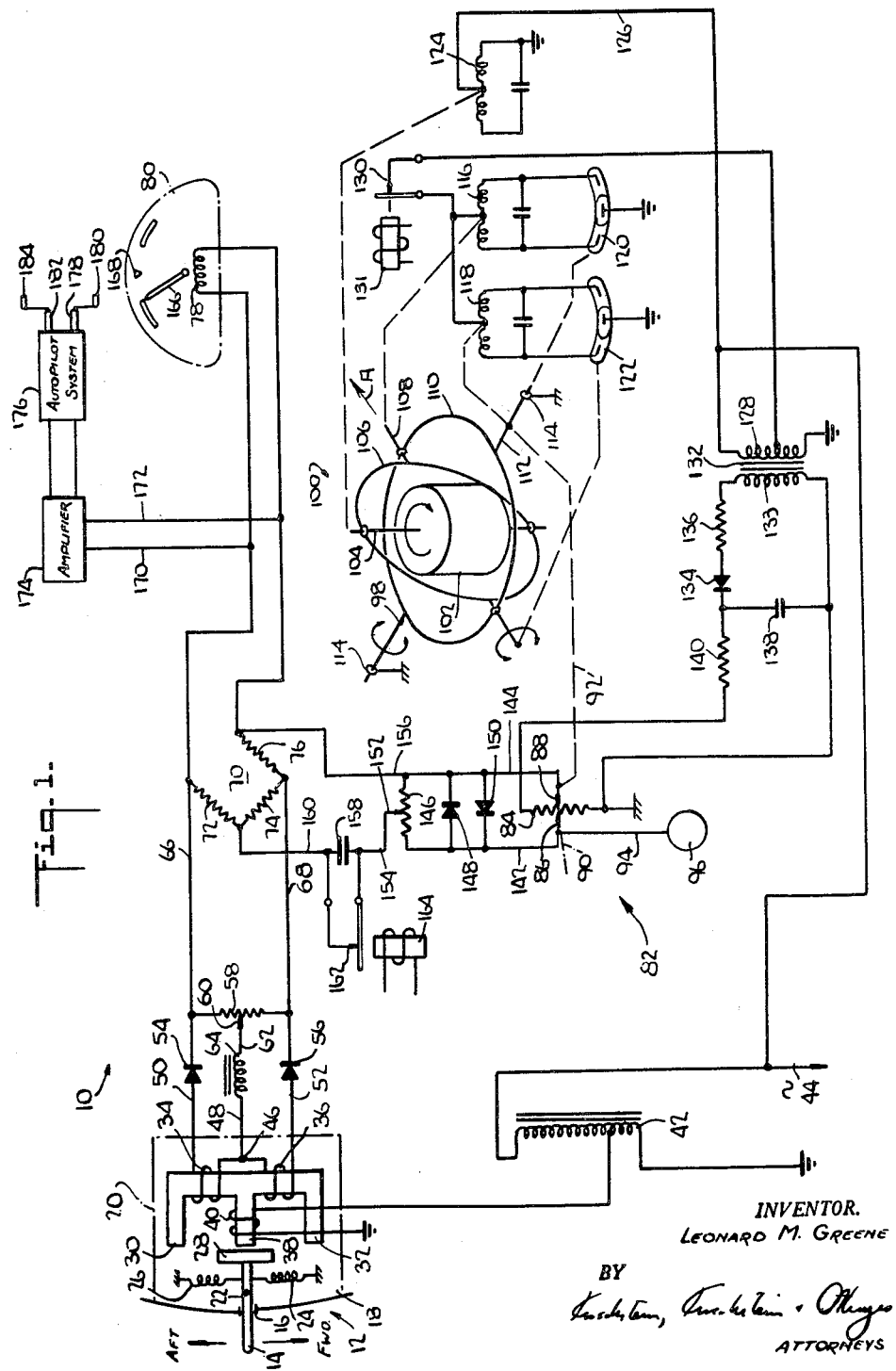

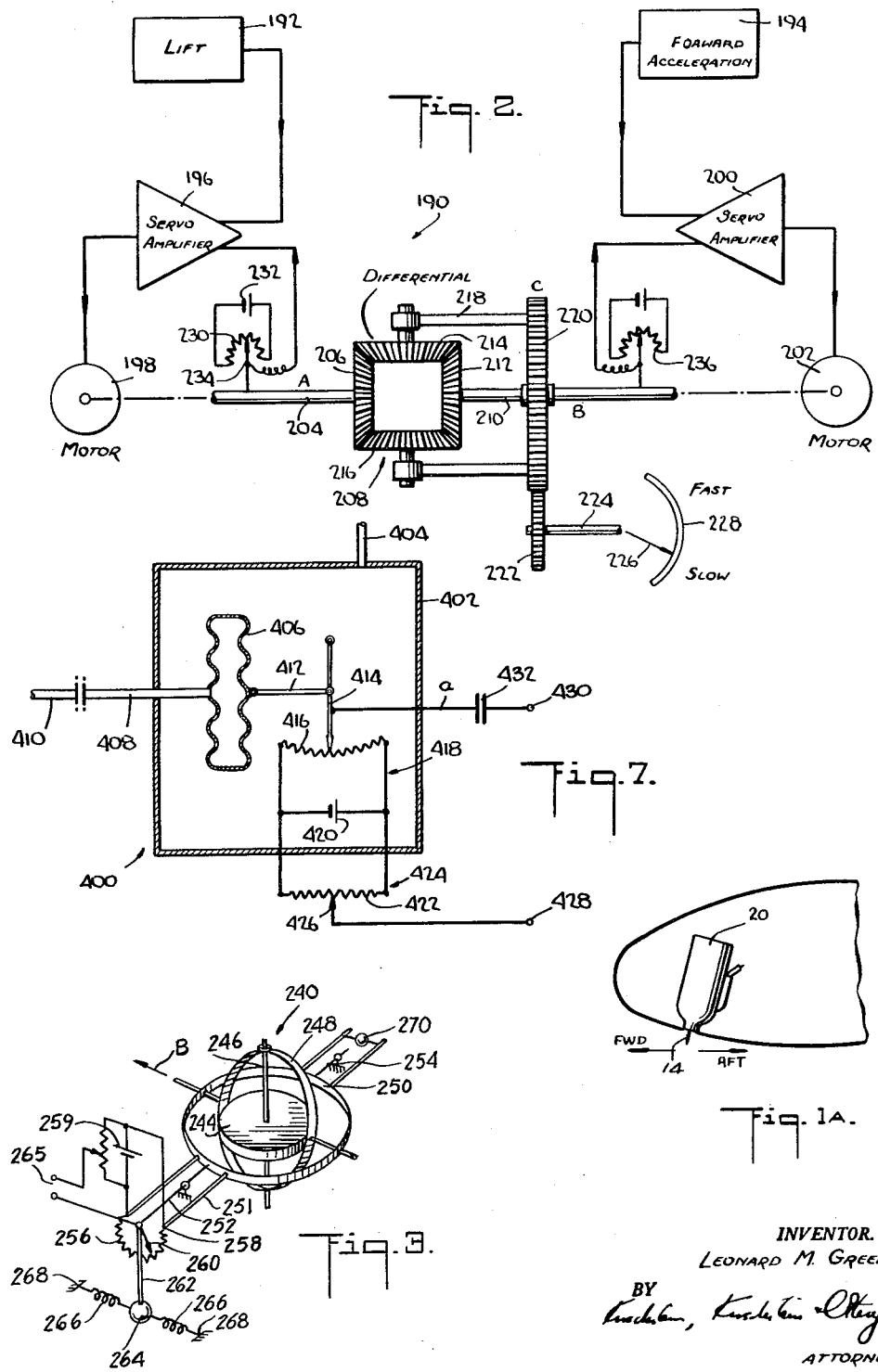

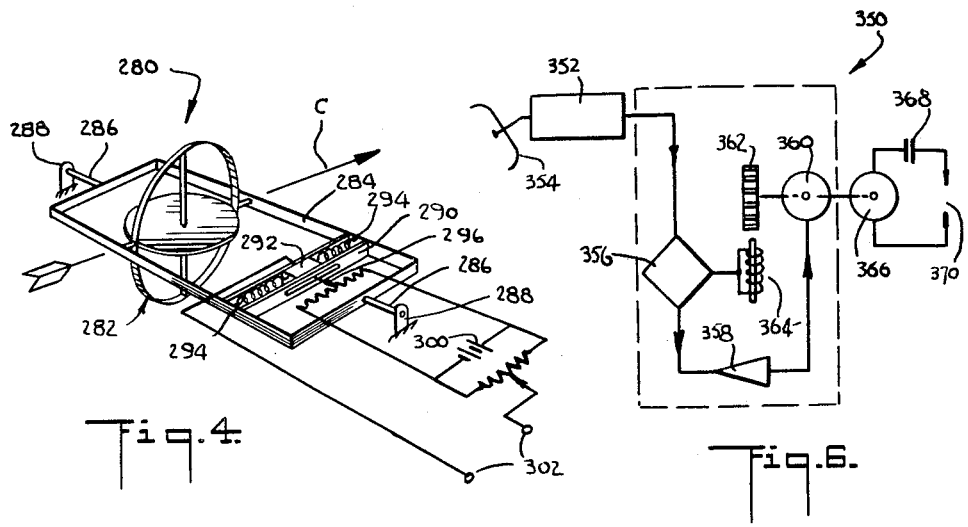
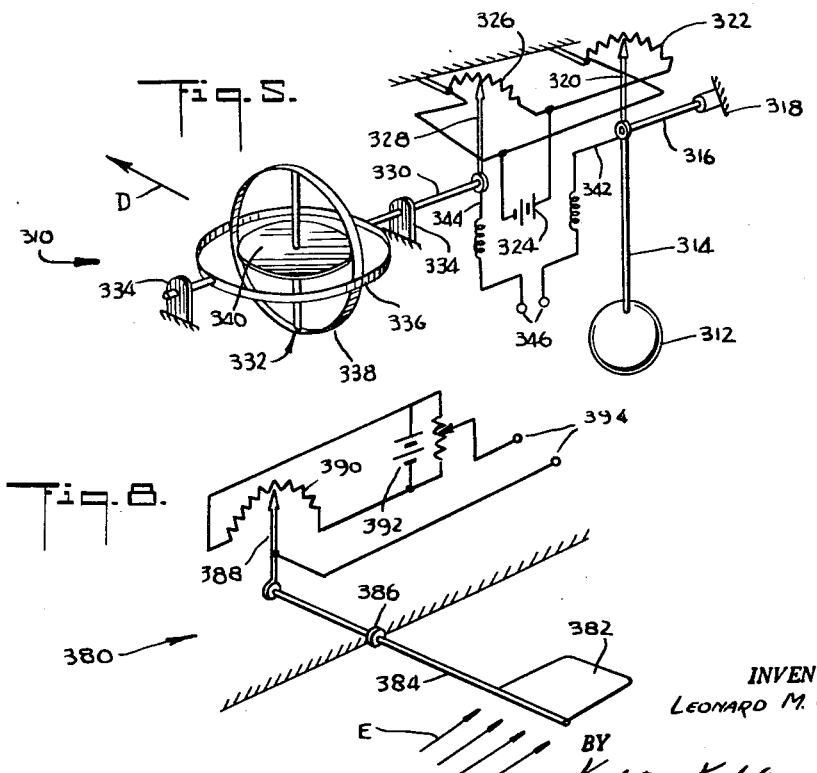

This invention relates to airplane instruments. More particularly, the present invention is a continuation-in-part of my copending application Serial No. 846,466, filed October 14, 1959, for Airplane Instruments.

Instrumentation and control of an airplane during airborne take-off or airborne landing approach or balked landing climb is particularly critical. "Airborne take-off" refers to the period between the moment that an airplane loses contact with the ground and the time that it is safely airborne. "Airborne landing approach" refers to the period when the aircraft during landing has reached such a low altitude that a change from approach to climb might be dangerous. This period terminates when the wheels of the airplane are firmly on the ground. "Balked landing climb" refers to the period of transition between a landing approach and a fresh climb and terminates when the airplane is safely airborne. In these periods an airplane is close to the ground and to buildings, trees, lamp posts, etc. in or near the airport near one or the other ends of the landing strip. The airplane is moving rather slowly, and has a high angle of attack. The margin of error permitted during these periods is small and yet the desire is to climb as quickly as possible in order that safety rapidly may be attained and the ground objects easily cleared and to approach as slowly as is possible for other reasons.

Moreover, it is desirable to employ runways of minimum length. Previous instrumentation did not provide a control signal which enabled a pilot to take quick advantage of the various factors that allow the maximum safe climb angle or minimum landing approach speed to be utilized during the three critical periods mentioned.

It therefore is the principal object of my invention to provide an airplane instrument which will yield a single output or signal that constantly, exactly, and with no noticeable time lag, shows to the pilot the manner in which the airplane controls should be operated during the aforesaid critical periods or else feeds an appropriate signal of the same character to a powered aerodynamic control.

It is another object of my invention to provide an airplane instrument through the proper use of which safe airborne take-off, airborne landing approach and balked landing climb can be achieved with a minimum length of runway.

It is another object of my invention to provide an airplane instrument which yields a signal that enables the pilot to take maximum advantage of the various factors which contribute to the steepest safe angle of climb or minimum landing approach speed that can be achieved under the prevailing circumstances.

It is another object of my invention to provide an airplane instrument of the character described which is adaptable for use in connection with an auto pilot system.

It is another object of my invention to provide an airplane instrument which will furnish a signal or variable output or both that enable a pilot at these aforesaid critical periods to secure maximum efficiency and safety in the operation of the aircraft insofar as lift is concerned.

It is another object of my invention to provide an airplane instrument of the character described which is adaptable for use in controlling the power, for example, the throttle, of an airplane engine or engines or the elevators.

Other objects of my invention in part will be obvious and in part will be pointed out hereinafter.

My invention accordingly consists in the features of construction, combinations of elements and arrangements of parts which will be exemplified in the airplane instruments hereinafter described and of which the scope of application will be indicated in the appended claims.

In the accompanying drawings in which are shown various possible embodiments of my invention, FIG. 1 is a composite circuit and schematic view of certain physical elements of an airplane instrument embodying my invention, the same illustrating examples of the two different types of mechanisms which are used in combination pursuant to my invention and an electrical means for summing the outputs of said mechanisms;

FIG. 1a is a schematic view showing the location of the lift sensing mechanism on an airplane wing;

FIG. 2 is a view similar to FIG. 1 of an apparatus embodying a modified form of my invention wherein the outputs of the different types of two mechanisms are mechanically summed;

FIGS. 3, 4, 5, 6 and 7 are schematic views of five alternate forms of one type of mechanism, to wit, the forward acceleration measuring means, these forms constituting, respectively, a ground plane stabilized pendulum-type thrust measuring means, a ground plane stabilized slide-type thrust measuring means, a pitch corrected pendulum-type thrust measuring means, a radar "Doppler" forward ground speed acceleration measuring means, and an air speed acceleration measuring means; and FIG. 8 is a schematic view of an alternate form of the other type of said mechanisms, to wit, the lift measuring means, the same constituting an angle of attack measuring means.

In general I achieve the several objects of my invention by combining two signals, the combination being effected in any suitable manner, for instance, by electrical summing or mechanical summing. The two signals are variable outputs of two different types of sensing mechanisms. The first sensing mechanism provides an output which is a measure, i.e., a function, of forward acceleration of an airplane. Said mechanism has a sensing element sensitive to forward acceleration and a transducer for changing the response of the sensitive element into a usable characteristic which varies in response to the sensitive element. The second sensing mechanism is characterized by the provision of an output which is a measure, i.e., a function, of the lift of an airplane. Like the first sensing mechanism it includes a sensing element, this however, being responsive to a lift value of the airplane such for instance as lift ratio, the fraction of which the numerator is the prevailing lift and the denominator is the maximum available lift, that is to say, the lift which would be available if the attitude of the airplane were changed to a point just approaching stall. The second sensing mechanism, like the first, further includes a transducer for changing the response of the second sensing element into a usable characteristic. In the preferred form of my invention, the two transducers are electrical so that the outputs from the two sensing mechanisms are electrical. The sensing elements can be either mechanical or electrical, and the summing mechanism likewise may be mechanical or electrical.

In accordance with my invention each of the two sensing mechanisms may be variously constructed. Thus, the first sensing mechanism may constitute a horizontally stabilized potentiometer and an inertial mass, such for instance as a pendulum or a sliding weight, for varying the output of the potentiometer; or said first sensing mechanism may comprise a potentiometer affixed to the air frame and having pairs of moving contacts respectively controlled by an inertial mass and a horizontally stabilized gyroscope, the output constituting the difference between the two regulations. Alternatively, the first sensing mechanism can comprise a pair of potentiometers carried by the air frame, one being regulated by an inertial mass and the other by a horizontally stabilized gyroscope, so that the combined output of the two potentiometers would be a function of ground plane acceleration. Still other arrangements can be used for the first type of sensing mechanism as, for instance, a conventional ground speed measuring means like a radar Doppler instrument modified to read in terms of acceleration rather than ground speed. Yet another arrangement may constitute an air speed acceleration sensing mechanism in the form of a conventional pitot-static system for measuring air speed and a sensing element which responds to the rate of change of the differential pressure thereof. It thus will be understood that my invention is not to be restricted to any particular combination of elements which is effective for obtaining an output that is a function of forward acceleration.

The second sensing mechanism is a mechanism the output of which is principally responsive to lift and, therefore, essentially constitutes a direct lift measuring means such, for instance, as a means for measuring the change in the position of the shifting stagnation point on the nose of an airplane wing or a means for measuring the angle of attack. Each of these means includes a sensing element responsive to the indicated condition. Also utilized with each of such means is a transducer for translating the response of the sensing element into an appropriate variable characteristic which can be combined with the output of the first type of sensing mechanism. As in the case of the first type of sensing mechanism, my invention is not to be limited to the specific combination of elements which make up the second type of sensing mechanism. Any mechanism that will yield an output which is variable principally in response to direct lift can be employed in accordance with my invention. As an example of such another mechanism, I may use an arrangement which computes the angle of attack from the wing load and dynamic pressure.

During the critical periods mentioned before, an airplane should be handled so as to obtain maximum safe lift whereby to secure maximum safe angle of climb or minimum safe landing approach speed. If at this time an airplane is experiencing forward acceleration, it means that the force propelling and sustaining the airplane in flight is accelerating the airplane rather than totally exerting the accelerative portion of said force in a direction opposing gravity as it should be if a maximum safe angle of climb or stabilized minimum landing approach speed is to be secured. In other words, if forward acceleration is present during one of these critical periods, the force creating it is not then being used to its best advantage which is to increase angle of climb or stabilize the landing approach speed. Phrased differently, the output from the first sensing mechanism is a measure of the potential influence of the forward acceleration on the existing lift of which the second sensing mechanism furnishes a measure. Hence, by summing up the two measurements I am able, so to speak, to obtain a single measurement which in effect is a function of total available lift, that is to say a function of the lift that can be expected to be obtained. It is an anticipation of an equilibrium condition not then present, but soon to be arrived at. By analogy it is like a combination of two types of energy, to wit, potential energy and kinetic energy, wherein the kinetic energy is to be converted into potential energy.

Specifically, considering the airborne take-off period, which it will be understood is only an example and is not the sole application of my invention, should forward acceleration be present during airborne take-off, the rate of climb could be increased and, as a matter of fact, automatically, that is to say due to the stability characteristics of an airplane inherently, will increase in a comparatively short period of time if the signal is held constant by proper manipulation of the controls, usually the elevators during airborne take-off and the throttle during landing approach. If it has been determined that a certain value of lift ratio should be present for an optimum angle of climb during airborne take-off and if my instrument shows this figure, it will mean either one of two things, to wit, that this desired lift, and therefore the desired rate of climb, prevails, or that the proper lift is not present, for instance less than the requisite lift is present, but that forward acceleration is being experienced and that the two taken together provide the correct reading. But in the latter case, due to the forward acceleration, the lift of the airplane inherently will increase over a comparatively short period of time, at which time equilibrium will be attained with the lift at the proper figure and with forward acceleration reduced to substantially zero. Thus, my instrument acts, in effect, to anticipate the aerodynamic condition which the airplane will assume in the near future due to the effect which acceleration has upon lift. Phrased differently, the instrument, if forward acceleration is present, will translate the effect of this acceleration into the ultimate lift that soon will be obtained, so that simply through the use of the airplane controls by maintaining the reading of my instrument at a constant figure, which has been predetermined, the pilot will know that the airplane is being correctly handled.

It should be observed that my instrument has other advantages which automatically will be secured simply by flying the airplane in a manner such as to hold the output of the instrument at a predetermined constant figure. Thus, if the airplane during climb is being so manipulated as to hold the output of my instrument at its proper predetermined reading and if an engine should fail or should deliver less than the power required, my instrument will anticipate the change that has to be made. The output reading of my instrument immediately will be reduced and this immediately will be corrected by the pilot either by altering the attitude of the airplane (with the elevators) or, if full power is not on, increasing the power output of the engines so as to hold the output figure constant, or, if the figure cannot be obtained, so to manipulate the airplane as to minimize the change of reading. Thereby the pilot will in effect anticipate the change to the new equilibrium condition which will be reached and he will do this in advance of the attainment of such condition. In this fashion the airplane experiences a smooth transition from one condition to another, thereby damping phugoid oscillations. For instance, in a case where the power of a motor seriously falls off during climb, the pilot not having my instrument when he notices falling air speed by manipulation of the elevator controls will lower the nose of the airplane and thereafter when the proper speed is attained will use the new angle of climb. In carrying out these manipulations without my instrument the airplane will, due to overshooting, experience phugoid oscillation in its attitude and lift until, finally, equilibrium is restored. The difficulty with this type of manipulation is that it assumes a sufficiently high altitude to permit the manipulation to take place but during take-off this freedom of maneuver may not be present and it may be impossible to recover. On the other hand, with the use of my instrument, by anticipating the ultimate equilibrium condition extremes of manipulation can be avoided and the transition will take place without endangering the safety of the airplane, providing that the new condition is a safe one. Thus, my instrument is able to detect any deviation from the proper combination of lift and forward acceleration that deleteriously affects proper handling of the airplane insofar as lift is concerned.

Moreover, when utilized in connection with a means for changing lift or forward acceleration, for example the elevators or throttles of the airplane, my instrument can function in combination therewith as an autopilot. By way of illustration, if a motor should fail during flight, my instrument immediately will detect the change in the lift and forward acceleration conditions that come into play, will emit if desired a signal indicating the degree of correction, and if connected to a proper utilization mechanism, e.g., the elevators or throttles, will supply such correction.

From the foregoing it will be appreciated that according to my invention I provide an airplane instrument comprising means responsive to the forward acceleration of an airplane during airborne take-off, landing approach or balked landing climb, means responsive to the departure of the lift of the airplane from a predetermined value during airborne take-off, landing approach or balked landing climb, and combining means providing a director signal which, when constant, establishes a relationship between lift and forward acceleration such that the lift is modified by an amount which is a function of the forward acceleration.

Further according to my invention, I provide an airplane instrument comprising means responsive to the forward acceleration of an airplane during airborne take-off, landing approach or balked landing climb, means responsive to the departure of the lift of the airplane from a predetermined optimum value at zero forward acceleration during airborne take-off, landing approach or balked landing climb, and combining means providing a director signal which, when at a predetermined constant value, establishes a relationship between lift and forward acceleration such that the predetermined optimum value of lift is modified by an amount which is a function of the forward acceleration.

Referring now in detail to the drawings, and more particularly to FIG. 1, the reference numeral 10 denotes a circuit for a typical instrument embodying my invention and illustrating the various elements which form part of said circuit. This instrument is an improvement over the airplane instrument shown, described and claimed in copending application Serial No. 408,382 filed February 5, 1954, by Leonard M. Greene and Dale H. Nelson, now U.S. Patent No. 2,945,375, and hereinafter referred to as the "former instrument."

It should be observed at this point that it is only in a narrow sense that the present invention may be considered an improvement over the former instrument since, actually, the present instrument although in many respects structurally and electrically similar to the former instrument is different in aerodynamic concept, in aerodynamic instrumentalities employed, and in method of operation from the former instrument.

As illustrated herein, said circuit 10 includes a sensing means 12 which specifically is responsive to lift ratio. It may be mentioned, however, that the component of this ratio which is employed in the present invention is prevailing lift. Said means constitutes a vane 14 which extends through a slot 16 in a mounting plate 18 that is adapted to be secured over an opening in the skin of the wing at the nose thereof.

The plate extends across and forms the front wall of a housing 20. Located in the housing is a pivot 22 for the vane so positioned that the vane is pivoted behind its center of pressure. Suitable means, such for instance as a pair of opposed springs 24, 26, are provided to bias the vane to an equilibrium position between stops. As will be appreciated from the description of the operation of the lift sensing means set forth in detail hereinafter, the particular location of the vane in the nose, the strength of the springs and the equilibrium point to which the springs bias the vane when the lift sensing means is idle are not critical for proper performance of the instrument.

The physical movement of the lift responsive vane is transduced to a variation in an electrical quantity. In general this is performed by having an element which moves with movement of the vane and is shiftable between a pair of members the nature of each of which is such that an electrical characteristic thereof, such for instance as capacity, inductance, induced voltage or impedance, changes with change in the relative position of said element and said members. The members are so arranged in circuit that the combined changes of the two members provide a single signal output which varies by a measurable electric circuit change, e.g., a change in magnitude, that is a measure of the change in lift. The changeable electrical characteristic of each member should be readily capable of yielding a polar indication per se, so that it can be determined which of the two members is being approached and which is being left by the element or, alternatively, said characteristic can be changed or modified for the purpose of polarization.

More specifically, and as shown herein, an armature 28, made, for example, of soft iron, is mounted on the vane for movement therewith in back of the pivot 22. The armature moves in a path of travel past the upper and lower arms 30, 32 of an E-shaped core, remaining magnetically coupled to the central arm. A secondary coil 34 is wound on a portion of the core in the magnetic circuit of the arm 30, and another secondary coil 36 is wound on a portion of the core in the magnetic circuit of the arm 32. The central arm 38 of the magnetic core has an exciting coil 40 wound around it. It may be mentioned that it is not necessary for the various arms 30, 32, 38 to form part of a single core. If desired, the coils 34, 36, 40 can have non-magnetic (air) centers and only be magnetically coupled by lines of force running through the armature 28.

It will be appreciated that with this arrangement the inductive excitation of the coils 34, 36 will vary with changes in location of the armature 28. For example, when the armature moves toward the arm 30 the inductive excitation of the coil 34 will be increased and, similarly, when the armature 28 moves toward the arm 32 the inductive excitation of the coil 36 will be increased. Increase in excitation of either secondary coil is accompanied by a corresponding decrease in excitation of the other secondary coil.

The exciting coil 40 is energized in any suitable manner, for example, from an auto-transformer 42 energized from an A.C. source of power 44 like the 115 volt, 400 cycle power source commonly found on airplanes. The secondary coils are connected in series at a junction 46 from which a lead wire 48 extends. The outer terminals of said coils are respectively connected by lead wires 50, 52 to rectifiers 54, 56 the outputs of which feed the opposite ends of the winding of a null potentiometer 58. Said potentiometer has a settable contact 60 connected by a lead wire 62 to one terminal of a compensating inductive reactor 64, the other terminal of which is connected to the lead wire 48. It will be observed that the two rectifiers 54, 56 are arranged to conduct in the same direction to opposite sides of the winding of the null potentiometer 58.

When the instrument is installed the arm of the null potentiometer is moved to a balanced position such that the voltage drop across said potentiometer is zero for a certain condition of flight, preferably for the condition of maximum desired rate of climb in calm air in the absence of forward acceleration. The zero condition, as later will be pointed out, is the central or null position on a reading meter. With the null potentiometer arm so set the voltages generated in the coils 34, 36 and rectified in the rectifiers 54, 56 are perfectly balanced across the potentiometer 58 with respect to the arm (movable contact) of said potentiometer. It will be appreciated that due to this arrangement the location of the vane, the direction of biasing and the strengths of the biasing springs are not critical inasmuch as despite any particular value assigned to anyone of these elements a null point still can be obtained by shifting the null potentiometer settable contact 60.

It will be seen that the lift sensing means in effect forms part of a bridge of which the coils 34, 36 constitute two legs and the two sections of the null potentiometer on opposite sides of the null arm constitute the remaining two legs. The two coil legs are exposed to ambient conditions which are expected to vary very widely, temperature changes from as low as from −60° to as high as 340° F. being normally encountered. However, since both said legs of the bridge are similarly exposed to the same ambient conditions they are affected to a like degree and thus any changes in ambient conditions which otherwise will affect the sensing means are cancelled out.

It will be understood that the null point balancing potentiometer has a variable output across its winding which in effect provides a comparison of the variable electrical output of the two coils 34, 36, thus yielding a single measurement that constitutes the output of the lift transducer which is responsive to the position of the vane. That is to say, if the electrical variable, i.e., voltage, generated in the coil 34, upon change in the position of the vane, becomes larger than it was at the null point setting and the voltage generated in the coil 36, upon the same change in position of the vane decreases, the output of the null circuit constitutes a single voltage signal that indicates this change. Similarly a change in the opposite direction will be shown by a voltage signal of opposite sign which thereupon will comprise the output of the null circuit.

Comparison of the two voltages generated in the secondary coils will show that one is larger than the other if there is a shift from null position. Nevertheless, if the voltages opposed across the potentiometer windings are A.C. the transduced output of the lift sensing circuit merely will show that there has been a change from null position, i.e., an imbalance, but it will not tell the direction in which the change has occurred. If the shift of the stagnation point is such that the wing approaches stall, the vane will shift the armature 28 in a direction to induce an increased voltage in the coil 36. For an opposite shift of the stagnation point induced voltage will be increased in the coil 34. It is to enable the output signal of the sensing circuit to constitute a polar signal, i.e., one which indicates a shift of phase as well as of magnitude, that the rectifiers 50, 52 are employed. These rectifiers polarize the output signals from the two coils and thereby provide a signal for the output of the rectifier which will be positive when the voltage of one of the coils overbalances the other and negative under reverse conditions. It thus will be apparent that the resultant voltage appearing across the winding of the null potentiometer has a magnitude and sign which are a continuous function of lift and will vary in magnitude and sign to both sides of any selected null lift condition.

The output from the null potentiometer winding appears across the lead lines 66, 68 and is applied to two opposite junctions of a bridge 70 which constitutes an electric summing mechanism. Said mechanism essentially constitutes an impedance bridge having four arms of equal impedance, these constituting resistors 72, 74, 76 and a coil winding 78 of a reading meter 80. The lead line 66 is connected to the junction between the resistor 72 and the coil 78 while the lead line 68 is connected to the junction between the two resistors 74, 76.

The instrument 10 also includes, as noted previously, a forward acceleration sensing means 82 which includes a forward acceleration sensing element and a transducer for converting the response of said element to forward acceleration into a variable electrical characteristic. Said means is responsive to the forward acceleration of the airplane and will provide a variable electrical signal that fluctuates in response to changes in said forward acceleration. The element physically responsive to forward acceleration can, as mentioned earlier, take on any desired physical form only one of which will now be described with reference to FIG. 1 wherein I have shown said means as comprising a pendulum-type thrust accelerator corrected to cancel the effect of pitch angle.

More particularly, the forward acceleration sensing means 82 includes a conventional circular potentiometer resistance winding 84 which is secured to the airplane framework. Unlike the usual potentiometer, the winding 84 instead of having a single contact mounted to move along the same is provided with two contacts or arms 86, 88 each of which is mounted to travel along the said winding without interference with the other. For example, the contacts may be mounted to engage opposite sides of the potentiometer winding or to engage radially inner and outer portions of the potentiometer winding so that the contacts can move past one another freely. The contact 86 is secured to a shaft 90 and the contact 88 is secured to a shaft 92, the two shafts being co-axial. The shaft 90 is arranged to be responsive to a pendulum-type thrust sensing member and the shaft 92 is horizontally stabilized.

Specifically, the shaft 90 is oriented and journalled to be perpendicular to the longitudinal axis of the airplane. Said shaft mounts a pendulum arm 94 at the end of which is suspended a pendulum weight 96.

The shaft 92 is coaxial with and connected to the pitch axis 98 of a vertical gyroscope 100. The gyroscope is of a conventional type including a spinning weight 102 secured to a vertical weight shaft 104. The ends of the weight shaft are journalled in a vertical gimbal ring 106 which lies in a vertical plane parallel to the longitudinal axis of the airplane, i.e., a fore-and-aft plane. The gimbal ring 106 is journalled to turn on a roll axis 108 on a horizontal second gimbal ring 110, the journal points being located in a fore-and-aft line lying in the plane of the first gimbal ring. The second ring is journalled, by horizontal shafts 112 that constitute the pitch axis, on a structural element of the airplane, e.g., in bearings 114 secured to the airplane framework. The pitch axis 112 is at right angles to the fore-and-aft direction A of flight of the airplane.

As is well known, with an arrangement of this character the gimbal ring 110 and the shafts 112 constituting the pitch axis will remain fixed (with the gimbal ring 110 horizontal) when the airplane experiences pitching movement, i.e., changes its pitch angle. That is to say, if the airplane rotates in space so as to raise or lower its nose, the gimbal ring 110 will not experience a corresponding movement but will remain fixed in a plane parallel to the ground.

The gyroscope 100 also includes the usual self-erecting mechanisms such, for instance, as a pitch erection motor 116 and a roll erection motor 118, said two motors being controlled respectively by a pitch erection mercury switch 120 and a roll erection mercury switch 122 of the usual gravity sensing type. It thus will be appreciated that the contact 88 will retain a fixed position in space as long as the gyroscope is erect and will therefore shift on the potentiometer winding when the pitch angle changes. It further will be appreciated that at any given time the contact 86 will occupy a position relative to the contact 88 which is a function of the horizontal plane forward acceleration, that is to say, the horizontal component of the longitudinal acceleration, this being the longitudinal acceleration vectorially minus that component thereof which constitutes acceleration radial to the earth.

A rotor motor 124 is connected to drive the spinning weight 102. Said motor is energized by a lead line 126 from the source of power 44. The pitch erection and roll erection motors 116, 118 are energized from the same source of power 44 through an auto transformer 128, the energizing circuit having series connected therein a normally closed pair of contacts 130 of a relay 131. Said relay normally is de-energized, that is to say, during ordinary flight, subsequent to airborne take-off, it is idle, i.e., unactuated. Said relay is energized either automatically or manually so as to open the contacts 130 when the takeoff run is started. For this purpose I may utilize an inertia switch or manually depress a button. In either event a timer is employed to maintain the relay 131 energized for a fixed period of time, preferably about three minutes, after it has once been energized. Thereafter, the relay will return to idle condition and the contacts 130 will reclose. However, during this crucial period after the take-off run has started, energization of the relay 131 holds open the contacts 130 and prevents the pitch erection and roll erection motors from operating. Thereby, during said period the horizontal gimbal ring 110 will be unaffected by change in orientation of the airplane and will retain a position perpendicular to the radius of the earth passing through the point where the take-off run was started. It should be noted at this point that the reason for the cut-out of the erection motors is that these motors are under the control of gravity sensing type switches, in this instance, arcuate mercury switches, and therefore the erection motors would be affected by the forward acceleration attendant upon take-off, so that if they were not cut out at this period the erection motors instead of truly erecting the gyroscope and holding the gimbal ring 110 horizontal, would tilt the gyroscope and tilt said ring.

For convenience I supply potential to the winding of the forward acceleration potentiometer 84 from the source 44 of power, using for this purpose the auto transformer 128 as a primary winding which is coupled in a transformer 132 to a secondary winding 133. A rectifier 134 provides a half wave rectified output from the secondary winding 133, a resistor 136 and capacitor 138 forming a smoothing filter circuit. In addition, the output from the rectifier circuit includes a resistor 140 of large resistance value so as to provide a substantially constant current input for the potentiometer 84.

In the operation of the forward acceleration sensing means there are two variables. One of these is the forward thrust of the airplane which is substantially parallel to the longitudinal axis of the fuselage and the other the pitch angle. It is necessary to subtract the influence of pitch angle. This is done in the forward acceleration sensing means 82 shown herein by means of the two contacts 86, 88. The winding of the potentiometer 84, since it is tied to (functionally integral with) the framework of the airplane, experiences a rotation in space corresponding to the pitch angle of the airplane, but this is cancelled, in effect, by the horizontally stabilized contact 88 which seeks a spot on said winding which is a function of the pitch angle.

The contact 86 moves on the winding of the potentiometer 84 as a function of both pitch angle and forward acceleration, that is to say, because a pendulum is utilized, the position of the contact 86 is affected by the pitch angle since the pendulum seeks the earth's center, and the position of the contact 86 also is affected by acceleration since the pendulum is an inertia device. However, that portion of the position of the pendulum which is due to pitch angle is cancelled by the contact 88. In this manner the angular spacing along the potentiometer between the two contacts 86, 88 is a function of forward, in this particular instance ground plane, acceleration. Therefore, the voltage drop between said points is a signal that is a function of forward acceleration. Moreover due to the ability of the contacts to move past one another, the signal is of the null type.

The foregoing voltage signal appears on the two leads 142, 144 and is applied to a load potentiometer 146 which enables amplitude of the forward acceleration signal to be altered, independently of its variation in value as a function of change of forward acceleration.

Since for various reasons the forward acceleration signal might become unduly large and create an effect of apparent potential ability to increase lift which might be greater than the lift that can actually be developed, I prefer to limit the output of the forward acceleration sensing means. This limitation is such, desirably, that the output signal from the potentiometer 84—the forward acceleration transducer—does not exceed a value equivalent to, for example, approximately $\frac{1}{10}$ g. In the circuit shown this limitation of output is accomplished electrically by a pair of parallel reverse connected diodes 148, 150, e.g., silicon dioxide diodes, shunted across the output potentiometer 146 and each having a high forward resistance up to a value at which the desired limitation is to take effect. At this value the forward resistances of the rectifiers falls off so that an increased voltage output does not substantially change the voltage applied to the terminals of the resistance winding of the load potentiometer 146. In other words, due to the presence of the limiting rectifiers 148, 150 the voltage applied to the resistance winding of the load potentiometer 146 will increase with increased forward acceleration only up to a value equivalent, for example, to approximately $\frac{1}{10}$ g.

The output from the load potentiometer is taken from one terminal of said potentiometer and from the output contact 152 of said potentiometer, being applied to lead lines 154, 156. The lead line 156 runs to the junction between the resistor 76 and the meter coil 78. The lead line 154 runs to a condenser 158 which in turn is connected by a lead line 160 to the junction between the resistors 72, 74.

The condenser 158 is shunted by a pair of normally closed contacts 162 of a normally energized relay 164. The latter relay is de-energized, e.g., by a timing mechanism, a short period, for instance three minutes, after take-off run has started (preferably the same timing mechanism is used as that employed to control the relay 131) so that during airborne take-off, while the relay 164 is unactuated, the condenser 158 is shorted and at all other times the condenser 158 separates the potentiometer contact 152 from the bridge 70. The RC time constant of the condenser and the circuit resistance is longer than the period of response of the airplane but shorter than the period of consequential gyroscopic error due for example to precession and erection. A typical time constant is about twelve seconds.

It now will be seen that in normal operation of the instrument 10 the lead lines 66, 68 apply to two opposite terminals of the bridge a voltage which is a function of direct lift, and the lead lines 156, 160 apply to the remaining two terminals of the bridge, when the contacts 162 are closed, that is to say, during the period of airborne take-off, a voltage which is a function of forward acceleration. The bridge sums these two voltages in the meter coil leg 78 so that the meter reads a value which is a function of lift modified by forward acceleration.

For one desirable operation of the instrument 10 the contact 60 of the null potentiometer 58 is so set that at maximum safe angle of climb with no forward acceleration the needle 166 of the meter 80 will be at its center point indicated by the triangle 168. If then during airborne take-off the needle 166 is held (by proper manipulation of elevators and thrust) at the point 168, it is an indication either that the airplane is climbing at the maximum predetermined proper climb angle with no forward acceleration, or that the airplane is climbing at a somewhat lower angle, but that the forward acceleration when added to the actual lift provides a signal which holds the needle at the point 168, thereby anticipating that due to the aerodynamic stability characteristics of the airplane, the airplane soon will be at the proper maximum angle of climb with no forward acceleration. The location of the needle at the point 168 also may indicate that climb is at too steep an angle (short of stall) with negative forward acceleration and also is an anticipation of climb at the proper angle. Therefore, as long as the needle is held at the point 168 by correct handling of the power and elevator controls the airplane is being flown properly and the pilot need not independently watch air speed, rate of climb and lift measurements.

The setting of the lift potentiometer 58 can be varied, if desired, to employ other null points corresponding to different conditions of flight, or, if desired, the instrument can be used by preselecting different point-of-position readings corresponding to different conditions of flight. The setting of the forward acceleration potentiometer 146 may be different in different airplanes, inasmuch as the effect of forward acceleration upon lift in anticipation of the future actions of the airplane due to its aerodynamic stability characteristics may depend upon the type of airplane in which the instrument is located.

After the critical take-off period has passed, the relay 131 will be de-actuated, i.e., de-energized and the relay 164 will be energized, so that the contacts 130 will be closed and the contacts 162 open. Thereafter the signal fed to the bridge 70 from the forward acceleration potentiometer 84 has to pass through the condenser 158. Inasmuch as said condenser and the circuit resistance have a time constant longer than the period of response of the airplane, the forward acceleration signal will be summed with the lift signal and be read by the pilot up to the time that lift correction due to change in such acceleration takes place. However consequental errors in acceleration appearing over longer periods, e.g. 30 seconds and upward, will not affect the summed signal. It will be noted that during airborne take-off the condenser 158 is shunted out to prevent leakoff of the forward acceleration signal taking place at the moment the airplane leaves the ground and which otherwise would be lost due to the long time taken for the run down a take-off strip. It also should be mentioned that the forward acceleration signals subsequent to airborne take-off are not affected except to a very minor degree by the action of the erection motors during such acceleration since the response speed of the erection motors is slow, for example 2° a minute, in comparison to the almost instantaneous reaction of the pendulum and other inertial systems later described.

It further should be observed that it is within the scope of my invention to shunt the condenser 158, if desired, at times other than airborne take-off, e.g., during landing approach.

From all the foregoing it will be appreciated that the two signal outputs of the lift output potentiometer 58 and the forward acceleration transducer 84 are combined to provide a single composite signal which is a combined function of lift and forward acceleration. This signal is developed across the coil 78 where it regulates the position of the needle 166. The signal also can be used to operate a control mechanism. Thus, the composite signal can govern the operation of an auto pilot system which regulates the power output of the airplane engines or the setting of the elevators, so that the speed or lift of the airplane can be held at a value such that the maximum safe climb path is obtained and maintained for airborne take-off, and similarly for balked landing climb or the stabilized minimum landing approach speed can be obtained for a slow airborne landing approach.

More particularly, in FIG. 1, I have shown a pair of lead wires 170, 172 connected in parallel with the meter coil 78 and feeding an amplifier 174. The output of the amplifier feeds into a conventional auto pilot system 176 having an output shaft 178 which is mechanically linked to the elevator control 180 for the airplane. Thus, if the signal applied to the meter coil indicates that the rate of climb is too slow, the auto pilot system will be caused to act by said signal to automatically manipulate the elevator control so as to increase lift and rate of climb and vice versa. The auto pilot system thus will function to maintain the rate of climb at a correct value. It will be understood that a suitable coupling means such as is well known in the art is included so that the auto pilot system only is engaged with the elevator control when desired.

The system also may include means to control the speed of the airplane as by regulating the engine throttles, that is to say, said auto pilot system 176 has a second output shaft 182 mechanically linked to the engine throttles 184. This second output shaft should be uncoupled during take-off but engaged, if desired, during landing approach.

It further will be appreciated that although the principal purpose of an instrument embodying the present invention is for use during the particularly critical periods of airborne take-off, airborne landing approach or balked landing climb, the instrument also will function at other times when due to some untoward circumstance, such, for instance, as failure of a motor or sudden change in weather conditions, aerodynamic conditions are disturbed. At such time the instrument again will indicate to the pilot the anticipated, i.e., soon-to-occur, over-all aerodynamic condition of the airplane so far as it pertains to lift and thereby will enable the airplane to be controlled in a manner which will tend to minimize or altogether eliminate phugoid movement.

In FIG. 2 I have shown in schematic form another instrument 190 embodying a modified form of my invention. This instrument functions in the same manner as the instrument 10 heretofore described, differing therefrom principally in the summing mechanism. Accordingly, all of the details of the instrument and, more particularly, the specific details of the electrical lift sensing means and the electrical forward acceleration sensing means, have not been shown. Referring then to FIG. 2, the reference numeral 192 denotes a means having a variable electrical output which is a function of lift, and a means 194 having a variable electrical output which is a function of forward acceleration. The means 192 feeds a servo amplifier 196 the output of which is fed to a servo motor 198. The means 194 feeds a servo amplifier 200 the output of which is fed to a second servo motor 202.

The output shaft 204 of the first servo motor 198 is connected to a bevel gear 206 forming part of a differential gear train 208. The output shaft 210 of the second servo motor 202 is connected to a bevel gear 212 which likewise forms a part of the differential train 208, being coaxial with and opposed to the bevel gear 206. The remaining two coaxial opposed bevel gears 214, 216 of the differential train are journalled in a frame 218 mounted on a gear 220 freely turning on the shaft 210. The gear 220 meshes with a gear 222 having a one-to-two step-down with the gear 220. The latter gear 222 is fixed on a shaft 224 which turns a needle 226 of a reading meter 228, desirably, a null type of meter, that is to say, a meter the needle of which occupies a substantially central position on its scale under certain conditions.

For the feedback leg of the lift servo loop, I provide a potentiometer 230 energized by a battery 232 and having a movable contact 234 driven by the shaft 204. The signal from this contact is fed to the lift servo amplifier 196. A similar arrangement is provided for the forward acceleration servo amplifier 200, the latter constituting a signal from a potentiometer 236 the movable arm of which is driven by the shaft 210.

In the operation of the instrument 190 the signal appearing at the output of the lift sensing means 192 will, through the servo amplifier 196, control the angular position of the shaft 204. Similarly, the signal appearing at the output of the forward acceleration means 194 will, through the servo amplifier 200, control the angular position of the shaft 210. The differential train 208 mechanically sums these two signals by summing the angular positions of the two shafts, the summing appearing as the angular position of the shaft 224 and therefore of the meter 228.

It will be apparent that when the shaft 210 is stationary, the gear 220 will make one-half revolution for each full revolution of the shaft 204 or vice versa, whereby the shaft 224 will make one revolution for one revolution of the shaft 204. Similarly, if the shaft 204 is locked, the shaft 224 will make one revolution for each revolution of the shaft 210. Accordingly, the angular position of the shaft 204 constitutes the algebraic summing, mechanically obtained, of the angular positions of the shafts 204, 210.

It will be appreciated that if the instrument 190 is to actuate an auto pilot system, the angular position of the shaft 224 is transduced into an electrical signal in any desired manner, as for instance, through the use of a potentiometer.

The instruments 10 and 190 are typical examples of devices embodying my invention. It will be appreciated, however, that as mentioned earlier, the lift sensing means and the forward acceleration sensing means may be embodied in various types of instrumentalities and for the purpose of indicating the scope of my invention I have in the following portion of the specification given examples of different constructions of each of said means, it being understood that each of such constructions can be utilized in the instrument 10 or 190 in the place of the particular sensing means therein shown.

Thus referring to FIG. 3, I there have illustrated an alternate means 240 for sensing forward acceleration and transducing the same into a variable electrical signal. Said means 240 comprises a gyroscope 242 having a spinning weight 244 turning in a horizontal plane with the weight shaft 246 vertical. The ends of the weight shaft are journalled in a vertical gimbal ring 248 which lies in a vertical plane parallel to the longitudinal axis of the airplane, i.e., in a fore-and-aft plane. The ring 248 is journalled in a horizontal second gimbal ring 250, the journal points being located in a fore-and-aft horizontal line lying in the plane of the first gimbal ring. The second gimbal ring 250 is journalled by lateral shafts 252 on a structural element of the airplane, for example, between a pair of straps 254 that are rigidly secured to the airplane framework. The shafts 252 are coaxial and extend at right angles to the fore-and-aft direction of flight of the airplane indicated by the arrow B. As is well known with an arrangement of this character the gimbal ring 250 will remain horizontal in all positions of the airplane regardless of raising or lowering of the nose of the airplane. That is to say, the gimbal ring 250 will remain in a plane parallel to the ground.

Said gyroscope is provided with the same type of erecting mechanisms as the gyroscope 100 hereinbefore described, these erecting mechanisms being cut out during take-off. The erecting mechanisms will, of course, be reconnected to the gyroscope, as in the case of the gyroscope 100, after the take-off maneuver has been completed.

The gimbal ring 250, therefore, constitutes a horizontally stabilized member, that is to say, a member which will experience no rotation in space when the airplane pitches so as to alter its attitude with respect to the horizontal plane. Connected to the gimbal ring 250 or to a member, e.g. struts 251, operatively integral therewith is the winding 256 of a forward acceleration transducer potentiometer 258 energized by a battery 259. A contact arm 260 of the potentiometer rides on said winding, the shaft to which said arm is physically connected carrying a pendulum arm 262 at the end of which a bob 264 is secured. The pendulum shaft is perpendicular to the line of flight of the airplane, i.e. parallel to the shafts 252. The voltage signal appearing at the output terminals 265 is a function of forward acceleration, the variable factor which is caused by the pitch of the airplane having been eliminated by the horizontally stabilized gyroscope. This signal can be used as the forward acceleration signal in either of FIG. 1 or 2. For example, in FIG. 1 it will be applied across the leads 154, 156.

It will be apparent that if the airplane experiences pure horizontal acceleration, the pendulum bob 264 will move in a retrograde direction relative to the gyroscope thereby causing the contact arm 260 to shift along the winding 256 and thus vary the setting of the potentiometer as a function of such acceleration. Moreover, if the airplane is accelerating at a non-level attitude, the potentiometer winding 256 still will remain in the same position relative to the ground as it did before the airplane assumed such attitude and accelerated along an angular climb path. Accordingly, the bob 264 will move relative to the gyroscope 240 a distance which is a function of the forward acceleration and the setting of the potentiometer arm will be a function of the forward acceleration.

It is desirable to dampen the movement of the pendulum and restrict the same and for this purpose I provide a pair of opposed springs 266 each of which has one end connected to the pendulum and the opposite end to a different horizontally stabilized member 268, that is to say, for example, a different member carried by the gimbal ring 250. To balance the weight of the potentiometer and pendulum I provide a counter-weight 270 mounted on the opposite side of the gimbal ring 250.

Another modified form of forward acceleration sensing means is shown in FIG. 4, said means being denoted by the reference numeral 280. The means 280 differs from the means 240 principally in that a rectilinearly movable inertial mass is employed rather than a pendulum-type mass. Said means 280 comprises a gyroscope 282 the outer horizontal gimbal ring 284 of which is mounted by aligned shafts 286 to turn in bearings 288 lying athwart the longitudinal axis of the airplane, the direction of movement of which is indicated by the arrow C. The bearings are fixed to the frame of the airplane. The inner gimbal ring and spinning weight are arranged in the same manner as the corresponding elements of the gyroscope 242 hereinbefore described.

Carried by the gimbal ring 284 is an inertial system consisting of a track 290 in which a weight 292 is guided for linear movement in a direction perpendicular to the shafts 286. Inasmuch as said shafts are operationally integral with the track, said track will remain horizontal despite changes in the pitch of the airplane. Centralizing springs 294 restrict movement of the weight in its track. The weight carries the moving arm 296 of a potentiometer 298 across the ends of which potential is applied as by means of a battery 300. Thus, the potential appearing across the terminals 302 provides a signal which is a function of forward, in this instance, ground plane, acceleration, the pitch angle effect having been nullified by the mounting of the track in a plane which remains parallel to the ground plane. The output signal appearing across the terminals 302 is used as the forward acceleration signal in circuits like those exemplified in FIGS. 1 and 2. For example, in FIG. 1 this signal would be applied to the lead wires 154, 156.

In FIG. 5 I have illustrated another example of a forward acceleration sensing means 310 including a transducer to supply an electric signal which is a function of forward acceleration. In this means I measure the longitudinal acceleration of the airplane and from such measurement subtract the pitch angle effect in a manner somewhat similar to that employed in the corresponding means shown in FIG. 1.

The sensing means 310 comprises an inertia-responsive device such as a pendulum 312 carried by a rod 314 mounted on a shaft 316 secured to the frame 318 of an airplane and so oriented as to turn freely about a horizontal axis perpendicular to the longitudinal axis and direction of movement of the airplane indicated by the arrow D. Actuated by the pendulum rod 314 is a movable arm 320 of a potentiometer 322 connected by leads across a suitable source of potential as, for example, a battery 324. The potentiometer is carried by the frame of the airplane. Thus, the position of the arm 320 is a function of the longitudinal acceleration of the airplane. Actually, this position includes two components one being a function of forward acceleration and the other of pitch angle.

The sensing means 310, accordingly, further includes a second potentiometer 326 having a movable arm 328. Like the potentiometer 322 the potentiometer 326 is connected across the terminals of a suitable source of potential, e.g., the battery 324. The potentiometer arm 328 is fixed to the horizontally stabilized output shaft 330 of a gyroscope 332. Said shaft 330 is journalled on the framework of the airplane by bearings 334. The shaft 330 is oriented to lie perpendicular to the direction of flight D of the airplane. The shaft 330 is connected to the outer gimbal ring 336 of the gyroscope, the latter rotatably carrying the inner gimbal ring 338 by which the spinning weight 340 is supported.

The gyroscope will maintain the outer gimbal ring 336 in horizontal position despite changes in the pitch of the airplane so that the plane of said gimbal ring will remain normal to the earth's radius intersecting the airplane. As the pitch of the airplane changes, the potentiometer arm 328 will alter its position with respect to the resistance winding of the potentiometer 326, the latter being fixed on the framework of the airplane, and thereby produce a voltage which is a function of the pitch angle. This position of the arm 328 is subtracted from the position of the arm 320 by reading the output signal of the sensing means 310 across the two potentiometer arms, as by leads 342, 344 connected to output terminals 346 of the sensing means 310.

It thus will be apparent that the signal at said output terminals is a function of the forward acceleration of the airplane which, in accordance with the present invention, is summed up electrically or mechanically with a lift signal as in the instruments shown in FIGS. 1 and 2. For example, the output from the sensing means 310 can be applied in FIG. 1 to the lead wires 154, 156.

Another measuring means 350 for sensing forward acceleration and transducing the same into an electrical signal usable in a summing mechanism is illustrated in FIG. 6. Said means 350 comprises in part a conventional ground speed indicator of the radar Doppler type. Specifically, said means 350 includes a combined transmitter and receiver 352 mounted in the airplane and associated with a radar antenna 354 of the T.-R. type. The output from the set 352 is fed to a linear phase detector 356. The output of the detector feeds a servo-amplifier 358 that drives a servo-motor 360. The servo motor in turn spins a tone wheel 362 which is located adjacent a pick-up coil 364 the signal from which is fed back to the linear phase detector 356. This arrangement is a standard one, the combination of motor, tone wheel, linear phase detector, pickup coil and servo amplifier being sold by the General Precision Laboratory, Inc., 63 Bedford Road, Pleasantville, New York. The radar T.-R. antenna and T.-R. set likewise are conventional.

In the operation of the foregoing arrangement, the antenna is set to scan the ground below the airplane and the frequency shift between the transmitted and received pulses will be a function of the ground speed of the airplane due to the well-known Doppler effect. This difference of frequencies will regulate the speed of the motor 360 so that the motor speed in turn will be a function of the ground speed of the airplane.

However, a signal which is a function of ground speed will not per se be useful in an instrument embodying my invention. What is required is a signal that is a function of ground speed acceleration. To derive an acceleration signal from the ground speed signal, the motor 360 is coupled to drive a generator 366 the voltage from which is, accordingly, a function of forward ground speed. The generator is of the D.C. type so that its output constitutes a D.C. signal output. However, in one of the output leads there is interposed a condenser 368 which by capacitance effect will provide a signal that is the first differential of the electrical voltage signal appearing at the output of the generator 366. Phrased differently, when a change is experienced in the voltage output of the generator, the signal appearing across the output 370 of the measuring means 350 will be a function of the differential of the ground speed signal voltage with respect to time or, in other words, will be a function of the forward, in this instance ground speed, acceleration. This signal when summed with a lift signal will provide an indication or signal in accordance with my present invention. For example, it may be applied to the lead wires 156, 160, in FIG. 1.

Still another sensing means 400 is shown in FIG. 7, this likewise being a sensing means which is responsive to and gives a signal that is a function of forward acceleration. However, in this instance said means specifically is responsive to air speed acceleration and yields a signal which is a function of air speed acceleration. Said means includes a suitable arrangement for supplying a signal that is usable in a summing mechanism of the type illustrated, for instance, in the circuit of FIG. 1.

More particularly, the means 400 comprises a casing 402 the pressure within which is the ambient static pressure. This is derived by connecting the interior of the casing to the surrounding atmosphere, as by means of a conduit 404. Located within the casing is a hollow sealed flat bellows container 406 having a pair of opposed flexible walls of large area. A conduit 408 runs from the interior of said container to a Pitot tube 410 the open end of which is outside the airplane and faces in the direction of travel of the airplane so that there is developed within the container a net pressure which is the sum of the dynamic pressure and the static pressure then existing. The open end of the conduit 404 terminates in a position in which it develops the static pressure, that is to say, a position in which it is not influenced by the movement of air relative to the airplane. For example, the conduit 404 may terminate on the side of the fuselage. The difference between the pressures developed in these two conduits 404, 408, i.e., the differential pressure, is the dynamic pressure which is a function of air speed. Therefore, the amount that a flexible wall of the container 406 extends is a function of air speed.

An actuating lever 412 has one end pivotally connected to one of the flexible walls of the container 406 so that the position of the lever is responsive to the instantaneous value of dynamic pressure and, therefore, to the instantaneous value of air speed. The other end of the lever 412 is pivotally connected to a swing lever 414 having an end pivotally connected within the casing 402. The other end of the lever 414 rides on the resistance 416 of a potentiometer 418. A battery 420 is connected across the ends of the potentiometer 418. The resistance 422 of a second potentiometer 424 is shunted across the resistance of the potentiometer 418. The movable tap 426 of the potentiometer 424 is connected to one of the output terminals 428. The other output terminal 430 is connected to the movable contact of the potentiometer 418 through a condenser 432.

The signal appearing between the point $a$ and the terminal 428 varies as a function of air speed. The condenser 432 differentiates this signal so that the signal appearing across the terminals 428, 430 is a function of air speed acceleration. This signal when summed with a lift signal will provide an indication or signal in accordance with my present invention. For example, it may be applied to the lead wires 156, 160 in FIG. 1.

It will be understood that in all cases where I have mentioned application of signals from alternate forms of forward acceleration sensing means to the circuit of FIG. 1, they are in lieu of the signals derived from the forward acceleration sensing means shown in said figure.

Up to this point I only have mentioned alternate sensing means for supplying a signal responsive to forward acceleration. It also is within the scope of my invention to supply alternate sensing means for obtaining a signal which is a function of lift. Several such alternate means have been mentioned earlier herein and one such means is illustrated in FIG. 8. In this figure the reference numeral 380 denotes a lift sensing means including an angle of attack vane 382 of standard construction. Said vane is carried by a boom 384 extending into the air stream in a direction perpendicular to the line of flight E of the airplane and mounted for rotation about an axis parallel to its length by a journal 386 fast on the framework of the airplane. A movable arm 388 of a potentiometer 390 is operationally integral with the boom. The potentiometer is connected across a suitable source of potential as, for example, a battery 392. Thus, there appears at the output terminals 394 a voltage signal which is a function of the angle of attack and, therefore, of the lift of the airplane. This voltage signal can be utilized as the lift signal, being applied, for example, in FIG. 1 to the lead lines 66, 68 in lieu of the signal derived from the null potentiometer 58.

It will thus be seen that I have provided devices which achieve the several objects of my invention and are well adapted to meet the conditions of practical use.

As various possible embodiments might be made of my invention, and as various changes might be made in the embodiments above set forth, it is to be understood that all matter herein described or shown in the accompanying drawings is to be interpreted as illustrative and not in a limiting sense.

Having thus described my invention, I claim as new and desire to secure by Letters Patent:

1. An airplane instrument comprising means responsive to forward acceleration of an airplane, means responsive to lift of the airplane, each of said last-named means having a variable output, the response of the first mentioned means being essentially independent of the pitch attitude of the airplane, and means combining said outputs to provide a director indication.

2. An airplane instrument comprising means responsive to forward acceleration of an airplane, means responsive to lift of the airplane, each of said last-named means having a variable output, the response of the first mentioned means being essentially independent of the pitch attitude of the airplane, means combining said outputs to provide a director signal, and a utilization mechanism connected to be controlled by said director signal.

3. An airplane instrument comprising a pair of electrical elements each of which has a variable electrical output, means sensing forward acceleration of an airplane and varying the electrical output of one of said elements as a function of said forward acceleration of the airplane, said variation of the electrical output of said one element being essentially independent of the pitch attitude of the airplane, means sensing lift of the airplane, means varying the electrical output of the other of said elements as a measure of said lift, and means combining said electrical outputs to provide an electrical director indication.

4. An airplane instrument comprising a pair of electrical elements each of which has a variable electrical output, means sensing forward acceleration of an airplane and continuously varying the electrical output of one of said elements as a function of said forward acceleration of the airplane, said variation of the electrical output of said one element being essentially independent of the pitch attitude of the airplane, means sensing lift of the airplane, means continuously varying the electrical output of the other of said elements as a measure of said lift, and means combining said electrical outputs to provide a director indication.

5. An airplane instrument comprising means providing a variable electrical output as a measure of the forward acceleration of an airplane, said variation of the electrical output being essentially independent of the pitch attitude of the airplane, means providing a second variable electrical output as a measure of the lift of the airplane, and means combining said electrical outputs to provide a director indication.

6. An airplane instrument comprising means providing a variable electrical output as a measure of the forward acceleration of an airplane, said variation of the electrical output being essentially independent of the pitch attitude of the airplane, means providing a second variable electrical output as a measure of the lift of the airplane, means combining said electrical outputs to provide a director signal, and a utilization mechanism connected to be controlled by said director signal.

7. An airplane instrument as set forth in claim 6 wherein the utilization mechanism is an indicator.

8. An airplane instrument as set forth in claim 6 wherein the utilization mechanism is a meter.

9. An airplane instrument as set forth in claim 6 wherein the utilization mechanism is an autopilot system.

10. An airplane instrument as set forth in claim 6 wherein the utilization mechanism is an elevator control.

11. An airplane instrument comprising means providing an output variable as a measure of direct lift, means sensing the ground plane, means cooperating with said last-named means and providing an output variable as a measure of the ground plane acceleration of the airplane and essentially independent of the pitch attitude of the airplane, and means combining said outputs to provide a director indication.

12. An airplane instrument as set forth in claim 11 wherein the means providing an output variable as a measure of the ground plane acceleration of the airplane is a horizontally stabilized accelerometer.

13. An airplane instrument as set forth in claim 11 wherein the means providing an output variable as a measure of the ground plane acceleration of the airplane is a horizontally stabilized pendulum accelerometer.

14. An airplane instrument as set forth in claim 11 wherein the means providing an output variable as a measure of the ground plane acceleration of the airplane is a horizontally stabilized slide accelerometer.

15. An airplane instrument as set forth in claim 11 wherein the means providing an output variable as a measure of direct lift is a vane projecting from the nose of the airplane wing.

16. An airplane instrument as set forth in claim 11 wherein the means providing an output variable as a measure of direct lift is a vane projecting from the nose of the airplane wing in the region of influence of the shifting stagnation point on said nose.

17. An airplane instrument comprising means responsive to ground plane acceleration of an airplane, means responsive to lift of the airplane, each of said last-named means having a variable output, the response of the first mentioned means being essentially independent of the pitch attitude of the airplane, and means combining said outputs to provide a director indication.

18. An airplane instrument comprising means responsive to air speed acceleration of an airplane, means responsive to lift of the airplane, each of said last-named means having a variable output, the response of the first mentioned means being essentially independent of the pitch attitude of the airplane, and means combining said outputs to provide a director indication.

19. An airplane instrument comprising means responsive to the forward acceleration of an airplane during airborne take-off, landing approach or balked landing climb, said means being essentially independent of the pitch attitude of the airplane, means responsive to the departure of the lift of the airplane from a predetermined value during airborne take-off, landing approach or balked landing climb, and combining means providing a director signal which, when constant, establishes a relationship between lift and forward acceleration such that the lift is modified by an amount which is a function of the forward acceleration.

20. An airplane instrument comprising means responsive to the forward acceleration of an airplane during airborne take-off, landing approach or balked landing climb, said means being essentially independent of the pitch attitude of the airplane, means responsive to the departure of the lift of the airplane from a predetermined optimum value at zero forward acceleration during airborne take-off, landing approach or balked landing climb, and combining means providing a director signal which, when at a predetermined constant value, establishes a relationship between lift and forward acceleration such that the predetermined optimum value of lift is modified by an amount which is a function of the forward acceleration.

21. An airplane instrument comprising means responsive to the lift of an airplane, a Pitot system responsive to the forward air speed acceleration of the airplane and essentially independent of the pitch attitude of the airplane, each of said means and Pitot system having a variable output, and means combining said outputs to provide a director indication.

22. An airplane instrument comprising means responsive to the lift of an airplane, means responsive to the forward acceleration and pitch angle of the airplane, means responsive to the pitch angle of the airplane, means combining said two last-named means and obtaining a measurement responsive to forward acceleration of the airplane and essentially independent of the pitch angle of the airplane, and means combining the outputs of the lift responsive means and the forward acceleration responsive means to provide a director indication.

23. An airplane instrument comprising means responsive to the lift of an airplane, means responsive to the forward acceleration of the airplane and essentially independent of the pitch attitude of the airplane, said last-named means including a horizontally stabilized gyroscope having self-erecting means, and means to selectively render said self-erecting means ineffective.

24. An airplane instrument comprising means responsive to forward acceleration of an airplane, means responsive to lift of the airplane, each of said last-named means having a variable output, the response of the first mentioned means being essentially independent of the pitch attitude of the airplane, means limiting the output of the forward acceleration responsive means, and means combining said outputs to provide a director indication.

25. An airplane instrument comprising means responsive to forward acceleration of an airplane, means responsive to lift of the airplane, each of said last-named means having a variable output, the response of the first mentioned means being essentially independent of the pitch attitude of the airplane, means limiting the output of the forward acceleration responsive means to about 1/10 $g$, and means combining said outputs to provide a director indication.

26. An airplane instrument comprising a pair of electrical elements each of which has a variable electrical output, means sensing forward acceleration of an airplane and varying the electrical output of one of said elements as a function of said forward acceleration of the airplane, said variation of the electrical output of said one element being essentially independent of the pitch attitude of the airplane, means to change the rate of variation of said one electrical output responsive to forward acceleration of the airplane, means sensing lift of the airplane, means varying the electrical output of the other of said elements as a measure of said lift, and means combining said electrical outputs to provide an electrical director indication.

27. An airplane instrument comprising means responsive to lift of the airplane, means responsive to forward acceleration of the airplane, each of said means having a variable output, the response of the second named means being essentially independent of the pitch attitude of the airplane, a time integrated signal cancelling device connected to oppose the output of the second named means, and means to combine the output of the first named means with the combined output of the second named means and the time integrated signal cancelling device so as to provide a director indication.

28. An airplane instrument comprising means to generate a signal as a function of lift of the airplane, means to generate a signal as a function of forward acceleration of the airplane and essentially independent of the pitch attitude of the airplane, a time integrated signal cancelling device opposing the signal generated by the second named means, and means combining the signal of the first named means and the combined output of the second named means and the time integrated signal cancelling device so as to provide a director indication.

29. An airplane instrument as set forth in claim 28 wherein the time integrated signal cancelling device comprises a capacitance.

References Cited in the file of this patent

UNITED STATES PATENTS

| | | |
|---|---|---|
| 794,983 | Howell | July 18, 1905 |
| 2,442,630 | Wickesser | June 1, 1948 |
| 2,553,983 | Saxman | May 22, 1951 |
| 2,796,763 | Grosse-Lohmann | June 25, 1957 |
| 2,875,965 | Anderson et al. | Mar. 3, 1959 |
| 2,892,180 | Smith | June 23, 1959 |
| 2,945,375 | Greene et al. | July 19, 1960 |